United States Patent
Yoshikawa (10) Patent No.: US 10,580,307 B2
(45) Date of Patent: Mar. 3, 2020

(54) SHIP DISPLAY DEVICE

(71) Applicant: FURUNO ELECTRIC CO., LTD., Nishinomiya, Hyogo (JP)

(72) Inventor: Toru Yoshikawa, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 457 days.

(21) Appl. No.: 15/141,097

(22) Filed: Apr. 28, 2016

(65) Prior Publication Data

US 2016/0328118 A1 Nov. 10, 2016

(30) Foreign Application Priority Data

May 8, 2015 (JP) .................................. 2015-096096

(51) Int. Cl.
| | |
|---|---|
| *G06F 3/048* | (2013.01) |
| *G08G 3/02* | (2006.01) |
| *G01S 7/10* | (2006.01) |
| *G01S 13/93* | (2020.01) |

(52) U.S. Cl.
CPC .................. *G08G 3/02* (2013.01); *G01S 7/10* (2013.01); *G01S 13/9307* (2013.01)

(58) Field of Classification Search
CPC ............... G06F 3/04817; G06F 3/0482; G06F 3/04842; A63F 13/5378; A63F 13/5252; G08G 3/02; G01S 7/10; G01S 13/9307
USPC ......................................................... 715/846
See application file for complete search history.

(56) References Cited

U.S. PATENT DOCUMENTS

| | | | | | |
|---|---|---|---|---|---|
| 3,623,090 | A | * | 11/1971 | Gilbert | G01S 13/787 342/29 |
| 4,914,733 | A | * | 4/1990 | Gralnick | G01O 23/00 340/961 |
| 2009/0079590 | A1 | | 3/2009 | Hiraoka | |
| 2011/0066362 | A1 | * | 3/2011 | He | G08G 5/0008 701/120 |
| 2012/0274504 | A1 | * | 11/2012 | Kubota | G01S 7/12 342/179 |
| 2013/0271309 | A1 | | 10/2013 | Kaida et al. | |
| 2013/0271492 | A1 | * | 10/2013 | Shimizutani | G09G 5/006 345/634 |

(Continued)

FOREIGN PATENT DOCUMENTS

| | | |
|---|---|---|
| JP | 10-288663 A | 10/1998 |
| JP | 2001-281331 A | 10/2001 |

(Continued)

*Primary Examiner* — Renee D Chavez
*Assistant Examiner* — Jianmei F Duckworth
(74) *Attorney, Agent, or Firm* — Studebaker & Brackett PC (57) ABSTRACT

An AIS information display device comprises an information acquisition component, an icon generator, and a display component. The information acquisition component acquires bearing information, which is information about the bearing of other targets with respect to the position of the host vessel. The icon generator uses an icon-use host vessel symbol S3 and one other target symbol S2 to generate an icon 19 that indicates the relative bearings of the host vessel and another target. The display component displays the icon 19 generated by the icon generator. Consequently, a ship display device can be provided which makes every target easy to understand, even when there are many other targets around the host vessel.

9 Claims, 5 Drawing Sheets

(56) References Cited

U.S. PATENT DOCUMENTS

| | | |
|---|---|---|
| 2013/0286022 A1 | 10/2013 | Kubota et al. |
| 2014/0354466 A1* | 12/2014 | Nomura .................... G01S 7/04 342/104 |
| 2015/0025718 A1* | 1/2015 | Miichi ................. G09B 29/007 701/21 |
| 2015/0314840 A1 | 11/2015 | Okuda et al. |

FOREIGN PATENT DOCUMENTS

| | | |
|---|---|---|
| JP | 2007-004428 A | 1/2007 |
| JP | 2009-037445 A | 2/2009 |
| JP | 4925525 B2 | 4/2012 |
| JP | 2012-233743 A | 11/2012 |
| JP | WO2013/132999 A1 | 9/2013 |
| JP | 2013-222326 A | 10/2013 |
| JP | 2013-231844 A | 11/2013 |

* cited by examiner

TARGET DETAIL

MMSI: 1234567789

| | | | |
|---|---|---|---|
| RNG | 10.02NM | MMSI | 20141211O |
| BRG | 225.4° | NAME | SHIP-ABCDE |

| SENSOR | IDENTITY | VOYAGE | SCALE | QUALITY |

| | | | | |
|---|---|---|---|---|
| POSN | 35°31.1134'N | | CPA | ??? |
| | 135°24.5678'E | | TCPA | ??? |
| ROT | 708.7°/min | | HDG | 30.1° |
| SOG | 10.0kn | | COG | 35.2° |

TARGET LIST     MMSI: 123456789

| | | | |
|---|---|---|---|
| ◯△ | RNG 10.02NM | MMSI | 201412110 |
| | BRG 225.4° | NAME | SHIP-ABCDE |
| ◯△ | RNG ??.??NM | MMSI | 312523221 |
| | BRG ???.?° | NAME | SHIP-FGHIJ |
| ◯✈ | RNG ??.??NM | MMSI | 423634332 |
| | BRG ???.?° | NAME | PLANE-KLMNO |
| ◯△ | RNG ??.??NM | MMSI | 534745443 |
| | BRG ???.?° | NAME | SHIP-PQRST |

S2 S3 20 19 (repeated)

SHIP DISPLAY DEVICE

CROSS-REFERENCE TO RELATED APPLICATIONS

This application claims priority to Japanese Patent Application No. 2015-096096 filed on May 8, 2015. The entire disclosure of Japanese Patent Application No. 2015-096096 is hereby incorporated herein by reference.

BACKGROUND

Field of the Invention

The present invention relates to a ship display device. More precisely, it relates to the display of image information on a ship display device.

Background Information

Collision avoidance devices for ships equipped with a graphical display function have been known before now. Japanese Laid-Open Patent Application Publication No. H10-288663 (Patent Literature 1) discloses a collision avoidance device of this type. The collision avoidance device in Patent Literature 1 is configured such that a danger zone in which other ships pose a danger to the host ship is predicted and displayed at regular time intervals.

Also known is an other-vessel display device in which information about other ships obtained from a ship automatic identification system is narrowed down to information of high importance in order to improve visibility. Japanese Patent No. 4,925,525 (Patent Literature 2) discloses an other-vessel display device of this type. The other-vessel display device in Patent Literature 2 selects information of higher importance within a range set by the user, and displays other-vessel up to a preset upper limit so that the display will not become too complicated.

SUMMARY

However, although the configurations in the above-mentioned Patent Literature 1 and 2 did allow the overall situation around the host vessel to be easily ascertained, there was still room for improvement in that the situation for each individual other target could not be easily grasped intuitively.

The present invention was conceived in light of the above situation, and it is an object thereof to make it easy to understand each target with a ship display device even when there are numerous other targets around the host vessel.

The problem to be solved by the present invention is as discussed above, and the means for solving this problem, as well as the effects thereof, will now be described.

One aspect of the present invention provides a ship display device with the following configuration. Specifically, this ship display device comprises an information acquisition component, an icon generator, and a display component. The information acquisition component is configured to acquire bearing information, which is information about bearing of other targets with respect to position of a host vessel. The icon generator is configured to use a symbol representing the host vessel and a symbol representing one of the other targets to generate an icon indicating relative bearing of the host vessel and the one of the other targets. The display component is configured to display the icon generated by the icon generator.

Consequently, it is possible to have an icon display that focuses on the relation between the host vessel and one target, and the user can intuitively grasp the bearing of the other target with respect to the host vessel by looking at the displayed icon. Also, even if there are numerous other targets around the host vessel, the symbols for a plurality of other targets will not appear in a single icon, so symbolic information is displayed in a neater fashion, and each target can be easily understood.

The above ship display device preferably has the following configuration. Specifically, the information acquisition component is configured to acquire host vessel heading information, which is information about heading of the host vessel. The icon generated by the icon generator is configured to at least indicate the heading of the host vessel in addition to the relative bearing of the host vessel and the one of the other targets.

Consequently, the user can also grasp the heading of the host vessel by looking at the icon. Therefore, the system is more convenient to use.

The above ship display device preferably has the following configuration. Specifically, the information acquisition component is configured to acquire other vessel heading information, which is information about heading of the other targets when the other targets are ships. The icon generated by the icon generator is configured to at least indicate the heading of the one of the other targets, in addition to the relative bearing of the host vessel and the one of the other targets.

Consequently, the user can also grasp the heading of the one of the other target by looking at the icon. Therefore, the system is more convenient to use.

With the above ship display device, it is preferable if the icon generated by the icon generator is configured to at least indicate risk of collision between the host vessel and the one of the other targets that is obtained based on the information acquired by the information acquisition component.

Consequently, the user can also grasp the risk of collision between the host vessel and the one of the other targets by looking at the icon. Therefore, it will be easy to quickly carry out countermeasures to avoid collision.

The above ship display device preferably has the following configuration. Specifically, the information acquisition component is configured to acquire information related to the bearing of the other targets with respect to the position of the host vessel, and state of the other targets other than heading of the other targets when the other targets are ships. The icon generated by the icon generator is configured to at least indicate information related to the state of the one of the other targets.

Consequently, an even greater variety of information can be conveyed through icon, so the system is even more convenient to use.

The above ship display device preferably has the following configuration. Specifically, the information acquisition component is configured to acquire host vessel position information, which is information about the position of the host vessel, and other target position information, which is information about positions of the other targets. The icon generator is configured to generate the icon by changing at least one of size of the symbol for the host vessel, size of the symbol for the one of the other targets, and distance between the symbol for the host vessel and the symbols for the one of the other targets, according to distance from the host vessel to the one of the other targets.

Consequently, the user can grasp the distance from the host vessel to the one of the other targets, in addition to the bearing of the one of the other targets with respect to the host vessel, by looking at the icon. As a result, the user can more clearly understand the positional relation between the host vessel and the one of the other targets.

With the above ship display device, it is preferable if the display component is configured to display icons for the other targets along with text information about the other targets.

Consequently, since icons that give an intuitive understanding are displayed simultaneously with text suitable for grasping the situation in greater detail, the user can even more clearly understand what is happening with the other targets.

The above ship display device preferably has the following configuration. Specifically, the display component is configured to display symbols for one or more of the other targets, and gives a pop-up display of information about corresponding one of the other targets when one of the symbols for the other targets is selected. Content of the pop-up display includes an icon generated by the icon generator for the corresponding one of the other targets.

Consequently, the user can intuitively understand information about corresponding one of the other targets corresponding to a symbol, by selecting the symbol he wants to view and looking at the pop-up display and its attached icon.

The above ship display device preferably has the following configuration. Specifically, the display component is configured to display a list of information about the other targets. Items displayed in the list on the display component include icons generated by the icon generator.

Consequently, the user can intuitively grasp information about a plurality of other targets by looking at the icons lined up in the list display. Therefore, important other targets, etc., can be easily discovered.

With the above ship display device, it is preferable if, every time there is a change in the bearing of the other targets with respect to the host vessel acquired by the information acquisition component, the icon generator is configured to generate icons and the display component is configured to display the icons.

Consequently, changes in the situation around the host vessel will be reflected in the display of icons, so the user can grasp the most recent situation.

BRIEF DESCRIPTION OF THE DRAWINGS

Referring now to the attached drawings which form a part of this original disclosure.

DETAILED DESCRIPTION OF EMBODIMENTS

Figure 1:
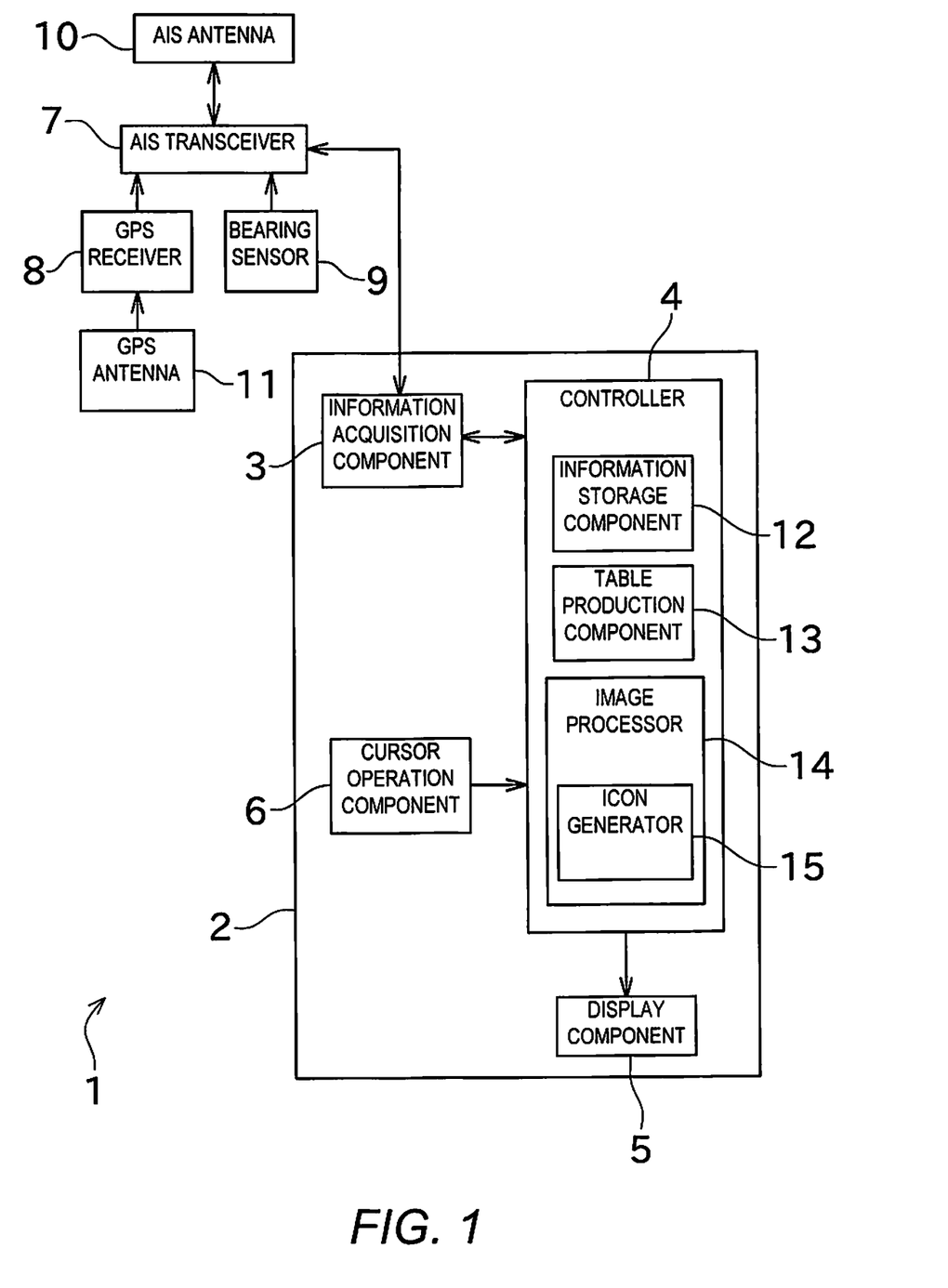
FIG. 1 is a functional block diagram of the overall configuration of an AIS pertaining to an embodiment of the present invention.

An embodiment of the present invention will now be described through reference to the drawings. FIG. 1 is a functional block diagram of the overall configuration of an AIS (automatic identification system) 1 comprising an AIS information display device 2 and pertaining to an embodiment of the present invention.

The AIS 1 shown in FIG. 1 comprises the AIS information display device 2, and an AIS transceiver 7.

The AIS information display device 2 comprises an information acquisition component 3, a controller 4, a display component 5, and a cursor operation component 6.

The controller 4 produces a specific image showing the situation around the host vessel based on various kinds of data obtained from the AIS transceiver 7, and outputs this image to a display component 5. The controller 4 also is configured to be able to control the AIS transceiver 7 as needed. The detailed configuration of the controller 4 will be discussed below.

An AIS antenna 10 is connected to the AIS transceiver 7, and is configured to receive AIS signals that are sent from other targets. If another target is a ship, the AIS signal received from the other target includes the name of the other vessel, the hull length, the beam, the current position, the course over ground, the speed over ground, the heading, the rate of turn, the navigation state, the draft, the load, the destination, and other such information. The main purpose of an AIS is to communicate between ships, but it is not limited to ships, and AIS information is also transmitted by ground stations, aircraft, and so on, and AIS signals include various kinds of information according to the type of target that sends the signal.

A GPS receiver 8 and a bearing sensor 9 for obtaining data about the host vessel position and heading, which is sent as AIS information to the surrounding area, are connected to the AIS transceiver 7. A GPS antenna 11 is electrically connected to the GPS receiver 8. With this configuration, the AIS transceiver 7 sends information obtained from the GPS receiver 8, information obtained from the bearing sensor 9, or the like as an AIS signal to other targets at a specific period. This AIS signal includes a signal the same as the AIS signal received from a ship when the other target is a ship.

The AIS information acquired from the other target by the AIS transceiver 7 is outputted to the controller 4 via the information acquisition component 3 provided to the AIS information display device 2. The information acquisition component 3 is configured as an external interface (such as a connector) for taking in the AIS information from the AIS transceiver 7 to the AIS information display device 2, and sending the AIS transceiver 7 a command from the AIS information display device 2.

The GPS receiver 8 is configured to receive a GPS signal from a GPS satellite and to acquire information related to the position of the host vessel (the absolute position using a terrestrial reference). The GPS information acquired by the GPS receiver 8 is outputted to the AIS transceiver 7.

The bearing sensor 9 is configured to acquire the heading of the host vessel (the absolute compass point using a terrestrial reference). A gyro compass is a specific example of this bearing sensor 9. The information about the heading of the host vessel acquired by the bearing sensor 9 is outputted to the AIS transceiver 7.

The AIS transceiver 7 produces AIS information from the GPS information acquired by the GPS receiver 8, the bearing information acquired by the bearing sensor 9, and so forth, and also sends this AIS information from the AIS antenna 10 toward the surrounding area as an AIS signal.

The AIS information display device 2 comprises the cursor operation component 6. This cursor operation component 6 is configured, for example, as a pointing device, an arrow key, or the like. The user operates the cursor operation component 6 to move a cursor 17 (see FIGS. 2 and 5)

Figure 2:
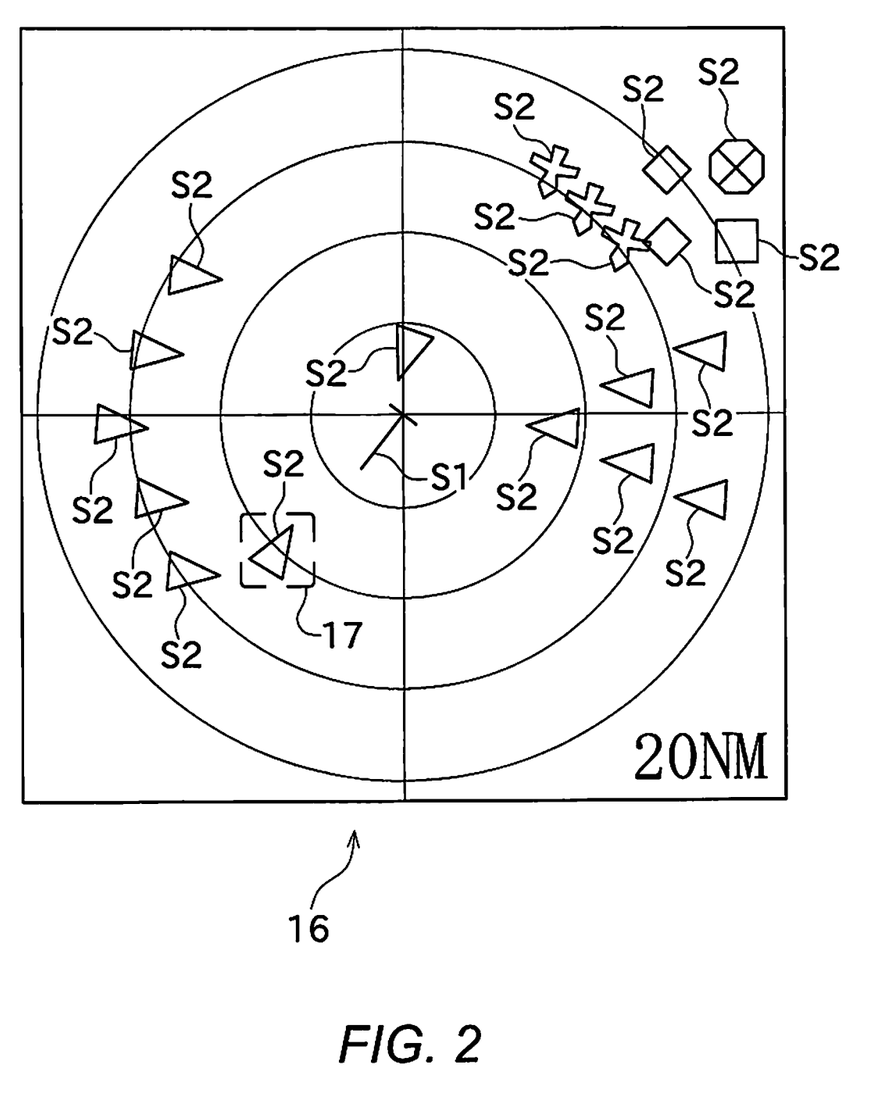
FIG. 2 is a diagram of an example of a plotter screen produced by a display component.
Figure 5:
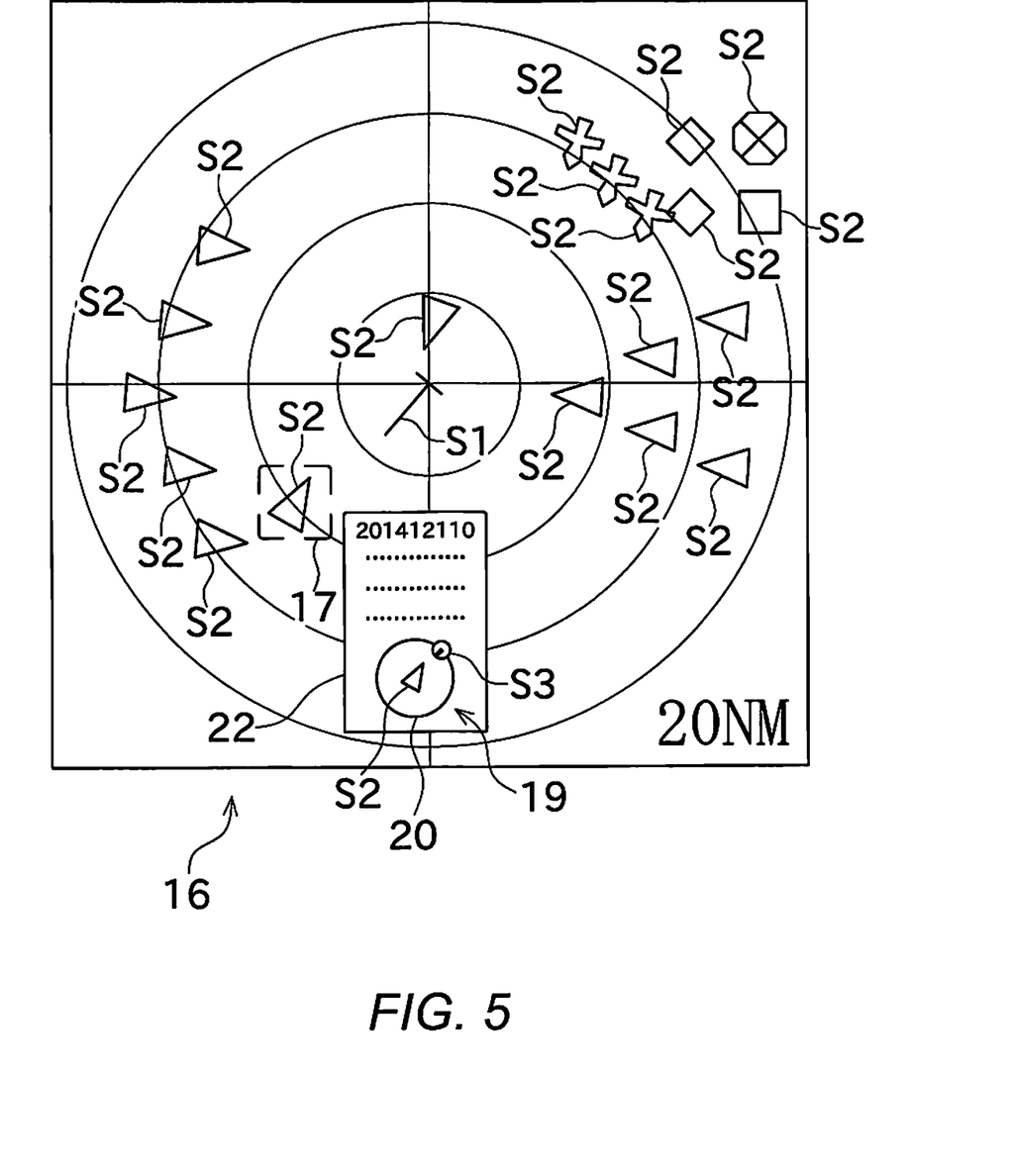
FIG. 5 is a diagram of a pop-up display of a plotter screen produced by the display component.

(discussed below) displayed on the screen of the display component 5, allowing the desired position on the screen to be designated.

As shown in FIG. 1, the controller 4 comprises an information storage component 12, a table production component 13, and an image processor 14.

More specifically, the controller 4 is configured as a computer equipped with a CPU, ROM, RAM, etc., and the information storage component 12 is configured as a RAM, ROM, HDD, or other such storage medium built into the computer. An AIS information display program for displaying AIS information on the display component 5 is stored in the ROM provided to the controller 4. The above-mentioned hardware and software work together to allow the controller 4 to operate as a table production component and an image processor.

The information storage component 12 acquires, via the information acquisition component 3, information about the AIS signal of the other targets received by the AIS transceiver 7, GPS information about the host vessel acquired by the GPS receiver 8, and heading information about the host vessel acquired by the bearing sensor 9, and stores this information.

The table production component 13 produces an other target information table, which is a list of information about the other targets located around the host vessel (in other words, other targets that have received AIS information).

The image processor 14 generates a plotter image of the area around the host vessel from the information in the other target information table produced based on the information obtained by the AIS transceiver 7. The host vessel, other targets, and so forth are graphically depicted in this plotter image. Also, the image processor 14 comprises an icon generator 15 that generates icons (small pictures) 19 (discussed below).

Next, the processing up until the controller 4 acquires AIS information and displays an image on the display component 5 will be described in specific terms.

Upon receiving the AIS information from other targets, the controller 4 assigns identification numbers that will allow each of the targets to be uniquely identified. The controller 4 also analyzes the AIS information for each other target, and acquires the longitude and latitude, etc., of the current position of the other targets. The table production component 13 then produces an other target information table that includes the identification numbers of the other targets and the longitude and latitude of their current positions, and stores this table.

The image processor 14 generates a plotter image based on the other target information table. The plotter image in this embodiment can be generated so that the host vessel is located in the center and the heading of the host vessel points up (known as "heading up"), or so that north points up. This embodiment also allows a course-up display. With a course-up display, when no destination has been set, the course at the instant the course-up mode is selected is displayed straight up. As the course changes, the host vessel mark also turns. When a destination has been set, the destination is displayed straight up.

FIG. 2 shows an example of a plotter image displayed on the display component 5. As shown in FIG. 2, a host vessel symbol S1 and other target symbols S2 are graphically displayed (that is, with pictures) on the plotter screen 16 on which the plotter image is displayed.

The host vessel symbol S1 is displayed in the center of the plotter screen 16, and represents the current position and heading of the host vessel. The host vessel symbol S1 is displayed as a T shape in which the end of a long straight line is connected perpendicularly to the middle of a short straight line, and the orientation of the distal end of the long straight line extending out from the short straight line indicates the heading. In the example in FIG. 2, the plotter image is generated so that north is fixed to point up on the screen (north up). The other target symbols S2 represent at least the current positions of the other targets. For example, if the other targets are ships, the other target symbols S2 are displayed as isosceles triangles, and the orientation of the vertex of the isosceles triangle indicates the heading of that ship (other ship).

The display component 5 is configured to be able to display the cursor 17, which is used by the user to designate the desired place on the plotter screen 16. This cursor 17 can be moved freely when the user operates the cursor operation component 6.

The display component 5 is configured so that when the user performs an operation of designating an other target symbol S2 with the cursor 17 (more specifically, an operation of pressing a select button (not shown) after the cursor 17 is superposed over the other target symbol S2), detailed information related to that other target can be displayed.

Figure 3:
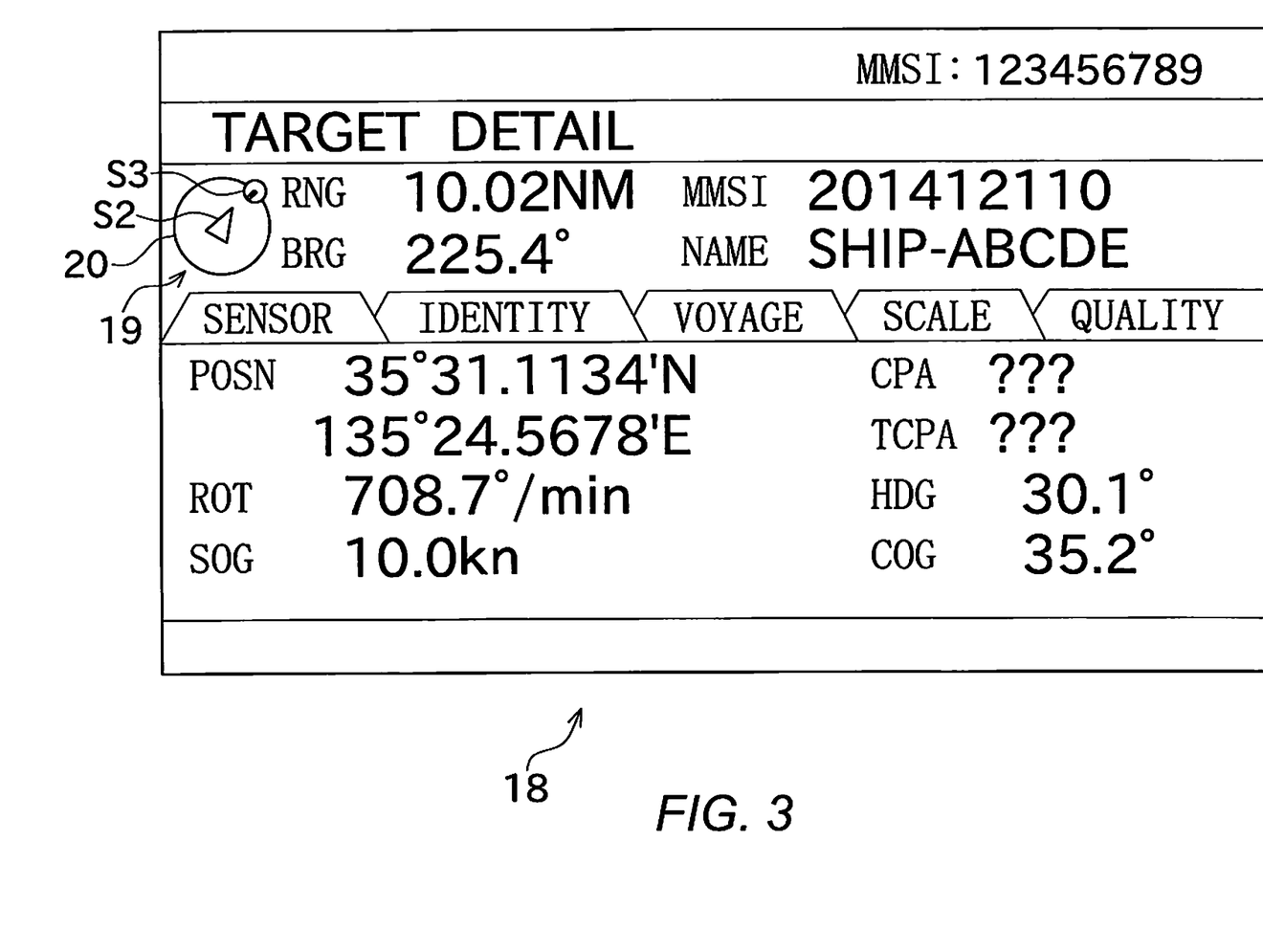
FIG. 3 is a diagram of an example in which icons have been added to the target detail screen produced by the display component.

As shown in FIG. 3, when one other target symbol S2 is designated and the select button is pressed, the display can be switched to a target detail screen 18 on which detailed information related to the designated other target is displayed in text. If the other target is a ship, for example, the information about the other target in this detailed display may be its identification number, the name of the vessel, the current position, the course over ground, the speed over ground, the heading, the rate of turn, and so forth, but the information is not limited to this. This allows the user to learn more detailed information about the other targets.

As shown in FIG. 3, in this embodiment, the icon 19 is displayed along with text information about the other target on the target detail screen 18. The icon 19 is an image (considerably smaller than the plotter image) used to display information that is more simplified than the plotter screen 16 shown in FIG. 2. This icon 19 gives information that focuses particularly on the relation between the host vessel and the other target. More specifically, the icon generator 15 acquires the relative bearing between the host vessel and this other target, the heading of the host vessel, and the heading of this other target, and generates an icon that indicates these relationships.

Even if another target is present near this other target, a single icon 19 will include only one other target symbol S2 (a plurality of other target symbols S2 are not depicted in a single icon 19). This simple display allows the user to understand the situation in an organized format for each target.

The isosceles triangular symbol in the center of the icon 19 is the other target symbol S2, which represents this other target for which detailed information is shown on the target detail screen 18. The small circular symbol on the outer circle 20 of the icon 19 is an icon-use host vessel symbol S3 that represents the host vessel. The position of the icon-use host vessel symbol S3 with respect to the other target symbol S2 in the icon 19 (the position of the icon-use host vessel symbol S3 on the outer circle 20) represents the relative bearing between the host vessel and the other target. Therefore, when the user sees the icon 19 shown as an example in FIG. 3, he can grasp the relative bearing relation between the host vessel and the other vessel, namely, that that the host vessel is located substantially to the north-east of the other vessel, and that the other vessel is located substantially to the south-west of the host vessel.

In the icon 19, the symbol representing the other target is the some one used in the plotter screen 16. In FIG. 3, an example is shown of a case in which the other target is a ship, so the other target symbol S2 in the icon is displayed by an isosceles triangle, and the direction of its vertex represents the heading of this other ship. Thus, in this embodiment, the orientation of the isosceles triangle of the other target symbol S2 indicates the heading of the other vessel. As a result, the user can also grasp the heading of another vessel by looking at the icon 19, which makes the device more convenient to use.

Also, a short straight line extending outward from the center is drawn inside the circular icon-use host vessel symbol S3, and the orientation of this straight line represents the heading of the host vessel. As a result, the user can also grasp the heading of the host vessel by looking at the icon 19, which makes the device more convenient to use.

With this target detail screen 18, the icon 19 of another target is displayed on a screen that is the same as the one displaying detailed information about the other target in text. Specifically, the display with the icon 19 for intuitive understanding is performed simultaneously with the display of text that is suitable to grasping the situation in greater detail, so the user can understand this other target even more clearly.

In this embodiment, the image displayed on the display component 5 (including the target detail screen 18) is generated by the image processor 14 in the controller 4 based on the AIS information acquired via the information acquisition component 3. Every time the information acquisition component 3 acquires information from newly received AIS information, the image is processed by the image processor 14, and that image is displayed on the display component 5. Therefore, the current position, heading, and other such information displayed as numerical values on the target detail screen 18 are updated to the latest information whenever new AIS information is received, etc.

Also, with the AIS information display device 2 in this embodiment, every time new AIS information is received, a new icon 19 is generated by the icon generator 15 of the image processor 14, and this is automatically reflected in the display of the icon 19 on the display component 5. Therefore, each time the state of another target (the bearing of the other target with respect to the host vessel, etc.) changes, a new icon is generated and displayed. Consequently, an icon 19 that is easy to grasp intuitively is displayed as the latest state on the target detail screen 18, so the user can easily grasp changes in the situation around the host vessel with the latest information.

In this embodiment, there is a limitation on the area of the target detail screen 18 in which the icon 19 can be displayed, so the display size of the icon 19 is always fixed. Because of this, regardless of whether the host vessel and the other target move closer together or farther apart, the display positions of the other target symbol S2 and the host vessel symbol S1 in the icon 19 will not move closer together or farther apart. In other words, the distance between the host vessel and the other target is not reflected in the display of the icon 19, and this affords a concise display and processing.

However, even though there is a limit to the size of the icon 19, the distance between the host vessel and the other target can be expressed in a simplified form, for example. It is possible to vary the size of the other target symbol S2 or the size of the icon-use host vessel symbol S3 (such as in three stages) on the icon 19 according to how the distance between the host vessel and the other target changes, for instance. Also, it is possible to vary the position of the other target symbol S2 (in other words, the distance between the other target symbol S2 and the icon-use host vessel symbol S3) by the range that fits within the outer circle 20, according to changes in the distance between the host vessel and the other target. In this case, the distance from the host vessel to the other target can also be grasped from the display of the icon 19, so the user can more clearly understand the positional relation between the host vessel and the other target.

Thus displaying an icon 19 that focuses on just the noteworthy information included in the AIS information allows detailed information about a particular other target to be displayed on the target detail screen 18, while allowing the relative relation between the host vessel and this other target to be easily and intuitively grasped. Also, displaying the icon 19 results in an organized, simple information display, and makes it easy to understand each target. At the same time, because the other target symbol S2 makes use of the same symbol for the plotter screen 16 and the target detail screen 18, the correlation between the plotter screen 16 and the target detail screen 18 can be pointed out more distinctly, so there is good operational feel in a screen transition.

Although not shown in the drawings, with the icon 19 in this embodiment, the risk of collision between the host vessel and another target can be displayed based on the relative bearing of the host vessel and the other target, the heading of the host vessel and the other target, and the relative distance between the host vessel and the other target. To give a specific example, the distance when the host vessel and the other target are at their closest point of approach, and the time until the closest point of approach between the host vessel and the other target are estimated by calculation, and if the resulting estimated distance and estimated time are short, at least part of the display of the icon 19 is changed (The method for determining the risk of collision by the above-mentioned estimation is known, and therefore will not be described in detail here). For example, it is conceivable that the inside of the outer circle 20 will be displayed in orange or another color that stands out, or that the color of the outer circle 20 itself is changed, or that the displayed is flashed. This makes it easier for the user to notice an important situation, so the user can quickly take measures to avoid a collision. Also, the display of the icon 19 is preferably changed to be more prominent in the event of an emergency (such as changing the display color to yellow, orange, or red).

In regard to the display by the icon 19, the configuration of this embodiment can be modified as follows.

As discussed above, the display of the icon 19 is updated every time new AIS information is received, but since there may be rather long time intervals between receipts of AIS information, there are situations in which the display of the icon 19 appears not to change. With this in mind, the icon 19 may express the current situation of the host vessel and the other target as if it were moving, rather than as a mere image. For instance, if the other target is a ship, and if that ship makes an abrupt turn, accelerates suddenly, or decelerates suddenly, an icon that expresses that change as an afterimage can be displayed. This makes it easy to grasp that a pronounced change in the situation has occurred with this other target.

Thus, the icon 19 indicates the bearing of another target with respect to the host vessel position, and the heading if the other target is a ship, and can also indicate other aspects of the state of the other target (such as a state related to turning, acceleration, or deceleration). This makes the device even more convenient to use.

The configuration of the icon 19 can also be such that the layout of the icon-use host vessel symbol S3 (a host vessel symbol) and the other target symbol S2 on the icon 19 is switched around by user operation (such as an operation using the cursor operation component 6). Specifically, a mode is also possible in which an icon display expressed with the other target in the center, and an icon display expressed with the host vessel in the center are switched. An example of expression with the host vessel in the center is one in which the host vessel symbol is displayed large in the center of the icon and the other target symbol is displayed small on the outer circle, but this is not the only option. Consequently, the relative relation between the host vessel and the other target can be seen from the viewpoints of both the host vessel and the other target, so the relative relation between the host vessel and the other target is even easier to understand.

Figure 4:
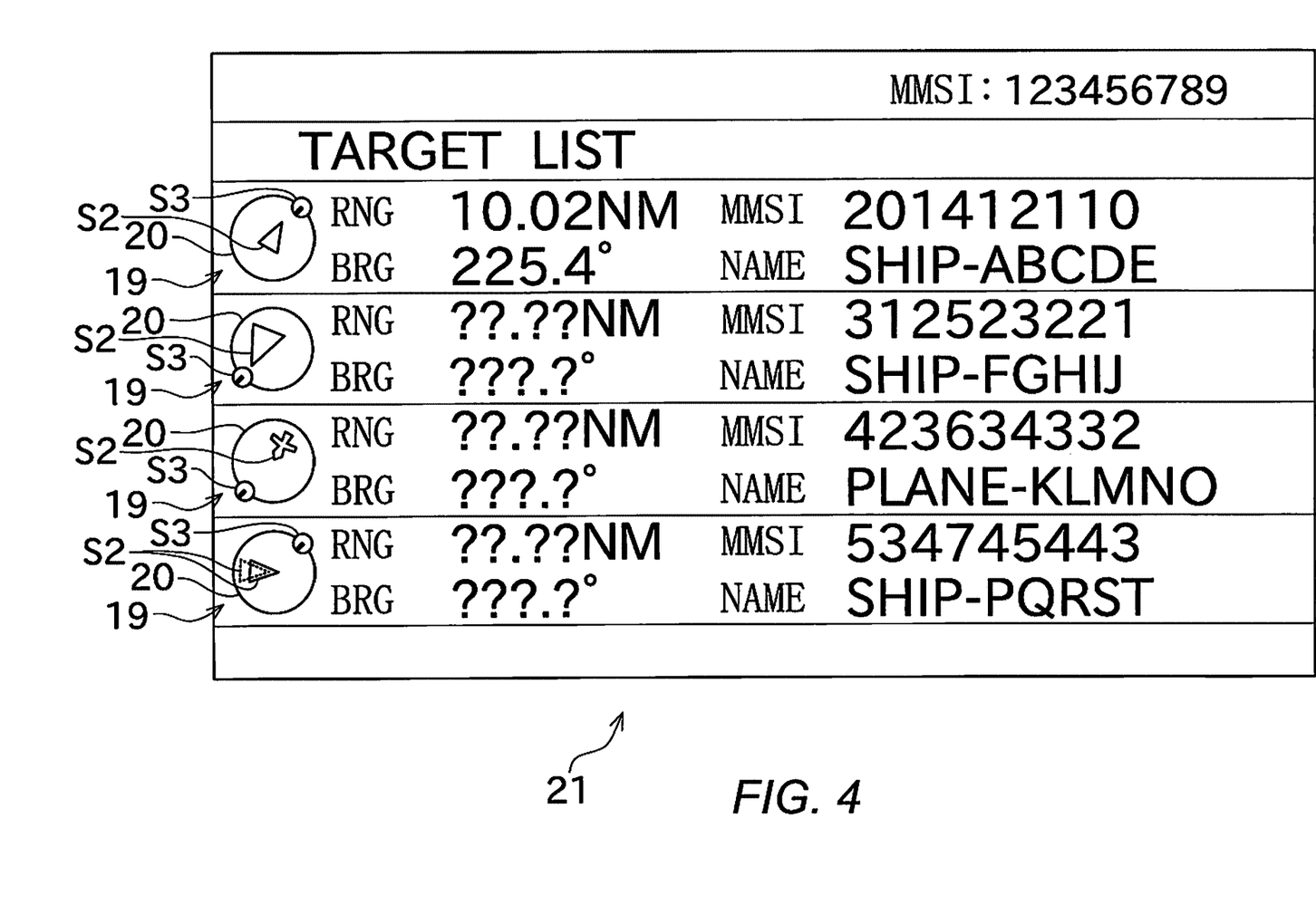
FIG. 4 is a diagram of an example of a list display produced by the display component.

List display will now be described through reference to FIG. 4. This display image is generated by the image processor 14 of the controller 4 and displayed on the display component 5. The list display screen 21 shown in FIG. 4 is such that there is less information than on the target detail screen 18, and detailed information about a plurality of other targets is displayed simultaneously in rows. In the example in FIG. 4, the identification number, the name of the vessel, the relative distance between the host vessel and this other target, and the relative bearing between the host vessel and this other target are displayed. However, the information displayed in each row of the list can be suitably modified according to the situation, such as how much display space is available.

Again with the list display screen 21, just as with the target detail screen 18, the same icon 19 as above can be displayed in addition to the text information for the other targets. Consequently, information about a plurality of other targets can be intuitively grasped by looking at the icons 19 displayed in the list display screen 21. Therefore, important other targets, etc., can be easily discovered.

A pop-up display will now be described. With the display component 5 in this embodiment, when the cursor 17 is hovered over the other target symbol S2 on the above-mentioned plotter screen 16, the configuration is such that information about that other target will be displayed in a pop-up window 22 at a position close to the other target symbol S2 (the cursor 17).

FIG. 5 shows an example of a pop-up display. Information about the other target corresponding to the one other target symbol S2 over which the cursor 17 is hovering is displayed as the pop-up window 22 on the plotter screen 16. The information displayed in the pop-up window 22 can be the same as that in the above-mentioned list display screen 21, or it can be suitably modified after taking the available display space and so forth into account.

Again with this pop-up display, just as with the target detail screen 18 and the list display screen 21, an icon 19 can be displayed. Consequently, the states of a plurality of other targets can be monitored in parallel on the plotter screen 16, while information about an important other target that was being focused on can be displayed so that it is easier to see.

With both of the list display screen 21 and the pop-up window 22 described above, the displayed icon 19 is updated to reflect the AIS information whenever new AIS information is received, just as with the target detail screen 18. Therefore, an icon 19 that is easily and intuitively grasped is displayed in its latest state, so the user can grasp changes in the situation around the host vessel with the latest information.

As described above, the AIS information display device 2 in this embodiment comprises the information acquisition component 3, the icon generator 15, and the display component 5. The information acquisition component 3 acquires bearing information, which is information about the bearing of another target with respect to the host vessel position. The icon generator 15 uses the icon-use host vessel symbol S3 and one other target symbol S2 to generate an icon 19 indicating the relative bearing between the host vessel and the other target (the relative bearing relation). The display component 5 displays the icon 19 generated by the icon generator 15.

Consequently, the use an intuitively grasp the bearing of the other target with respect to the host vessel by looking at the displayed icon 19. Also, even if there are numerous other targets around the host vessel, a plurality of other target symbols do not appear in a single icon 19, so a simple information display is given in an organized format, which makes it easier to understand each target.

A preferred embodiment of the present invention was described above, but the above configuration can be modified as follows, for example.

In the icon-use host vessel symbol S3, the heading of the host vessel can be expressed with some other graphic besides a short straight line (such as a T shape or a triangle). Also, in the icon-use host vessel symbol S3, the short straight line indicating the heading of the host vessel can be omitted (that is, the heading of the host vessel is not indicated by the icon 19).

The configuration may be such that the isosceles triangle of the other target symbol S2 that indicates a ship in the icon 19 always faces in a constant direction (such as straight up), regardless of the heading of the other vessel. In other words, the configuration may be such that the icon 19 does not indicate the heading of another vessel (another target), and instead indicates only the relative bearing between the host vessel and the other target. In particular, for targets not having any orientation information (such as a ground station), the icon is preferably displayed as above.

The graphics of the other target symbol S2 in the icon 19 can be modified as needed. For example, even with a ship, it may be displayed with some graphic other than an isosceles triangle. The outer circle 20 can also be eliminated.

The icon 19 can be modified to indicate various other kinds of information (such as the class of the AIS) in addition to what was discussed above.

The present invention is not limited to the AIS information display device 2 that acquires information by analyzing AIS information. For instance, in a DSB transceiver installed on a ship to exchange position information with other vessels, the configuration may be such that a display such as the above-mentioned icon 19 is performed when the bearing of another vessel (consort) or the heading of this other vessel is displayed on a display of this DSB transceiver.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section,"

"portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A ship display device comprising:
an external interface connector configured to acquire target information including a respective heading of each of a plurality of targets and position information identifying a respective position of each of the plurality of targets;
processing circuitry configured
to generate a vessel symbol
representing a host vessel and respective target symbols each representing one of the respective targets, and
having an orientation mark representing a heading of the host vessel or one of the target symbols respectively;
to determine a respective relative bearing of each of the respective selected targets, that are selected from the plurality of targets, with respect to a position of the host vessel;
to generate a plurality of relative bearing circle icons, with each of the relative bearing circle icons indicating a relative position relation between the host vessel and a respective one of the selected targets by using the target symbol of the one of the selected targets and the relative bearing of the one of the selected targets, wherein
the respective one of the selected targets is displayed in a center of the relative bearing circle icon, and
the host vessel is displayed on a perimeter of the relative bearing circle icon; and
to control a display to selectively display, on a screen, a first display including the vessel symbol and the respective target symbols in a manner indicating a relative positional relationship between the host vessel and each of the respective selected targets, and a second display including the plurality of relative bearing icons and respective information pertaining to each of the respective selected targets.

2. The ship display device according to claim 1, wherein the external interface connector is configured to acquire host vessel heading information, which is information about a heading of the host vessel, and
the processing circuitry is configured to generate the relative bearing circle icons to further indicate the heading of the host vessel.

3. The ship display device according to claim 1, wherein the processing circuitry is configured to generate the relative bearing icons to further indicate the respective heading of each of the respective selected targets.

4. The ship display device according to claim 2, wherein the processing circuitry is configured to generate risk information indicating a respective risk of collision between the host vessel and each of the respective selected targets based on the target information, and to control the display to display the risk information along with the relative bearing circle icons.

5. The ship display device according to claim 1, wherein the external interface connector is configured to acquire information related to a state of each of the respective targets other than a heading of the respective targets, and
each of the relative bearing circle icons includes the information related to the state of one of the respective selected targets.

6. The ship display device according to claim 1, wherein the external interface connector is configured to acquire host vessel position information about the position of the host vessel, and
the processing circuitry is configured to generate the relative bearing circle icons by changing, for each of the relative bearing circle icons, at least one of a size of the vessel symbol for the host vessel, a size of the target symbol for the selected target, and a respective distance between the host symbol and the target symbol for the selected target, according to the respective distance from the host vessel to the selected target.

7. The ship display device according to claim 1, wherein the processing circuitry is configured to control the display to display each of the relative bearing circle icons along with text information about the respective selected target.

8. The ship display device according to claim 1, wherein the processing circuitry is configured to control the display to display in the second display a list of information about the selected targets on the screen along with the relative bearing circle icons.

9. The ship display device according to claim 1, wherein every time there is a change in the bearing of a respective one of the selected targets with respect to the host vessel, the processing circuitry is configured to change a characteristic of the relative bearing circle icon pertaining to that respective one of the selected targets.

* * * * *